United States Patent
Baseghi et al.

[11] Patent Number: 5,465,405
[45] Date of Patent: Nov. 7, 1995

[54] APPARATUS AND METHOD FOR DETECTING SIGNALS

[75] Inventors: Behshad Baseghi; Mohammad Mazooji; Brian E. Holtz, all of Santa Barbara, Calif.

[73] Assignee: Raytheon Company, Lexington, Mass.

[21] Appl. No.: 333,619

[22] Filed: Nov. 2, 1994

Related U.S. Application Data

[63] Continuation of Ser. No. 922,218, Jul. 30, 1992, abandoned.

[51] Int. Cl.$^6$ .................................................... H04B 17/00
[52] U.S. Cl. .................... 455/226.4; 455/229; 375/343
[58] Field of Search ........................... 455/226.1, 226.2, 455/226.4, 214, 215, 229, 336, 337; 375/1, 96, 115, 343; 364/604

[56] References Cited

U.S. PATENT DOCUMENTS

| | | | |
|---|---|---|---|
| 4,038,540 | 7/1977 | Roberts | 375/96 |
| 4,064,361 | 12/1977 | Kustka et al. | 375/96 |
| 4,965,759 | 10/1990 | Uchida et al. | 375/96 |

OTHER PUBLICATIONS

Hagiwara et al. "Electronics and Communication in Japan" vol. 67–B, No. 10, pp. 66–74, May 1984.

*Primary Examiner*—Reinhard J. Eisenzopf
*Assistant Examiner*—Thanh Le
*Attorney, Agent, or Firm*—William R. Clark

[57] ABSTRACT

A circuit to improve the sensitivity of a receiver by more than 3 dB. According to the invention, conventional predetection integrators are replaced by a circuit to compute the correlation of the received signal with a delayed version of the received signal. The time delay is selected such that the noise in the signal and the delayed signal are statistically independent.

4 Claims, 4 Drawing Sheets

APPARATUS AND METHOD FOR DETECTING SIGNALS

This application is a continuation of application Ser. No. 07/922,218, filed Jul. 30, 1992, now abandoned.

BACKGROUND OF THE INVENTION

This invention relates generally to the detection of electrical signals and more particularly to an improved apparatus and method for detecting the presence of received signals in a noisy environment.

As is known in the art, it is often necessary to detect the presence of particular electrical signals being received in the presence of a noisy environment. One method for providing such detection is threshold detection, in which the magnitude of samples of a received signal are compared to a predetermined threshold level. If any such sample exceeds the threshold level, the presence of the signal is indicated. One problem with this technique however is that, in the presence of a noisy environment, the threshold level may be exceeded because of received noise and thus, the presence of the signal may be falsely indicated.

Another method known in the art for reducing the occurrence of such false signal indications is to filter the received signal by averaging a plurality of successive samples of the received signal and comparing the averaged value to the threshold level to provide the signal presence indication. The averaged sample value is ideally unaffected by white noise since the average value of such noise approaches zero. However, a drawback of this technique is that, due to the practical limitation of the number of samples used to compute the averaged sample value, some error will occur as a result of received noise. In other words, in applications where the signal to noise ratio of the received signal is below a certain value, the rate of false signal indications may be unacceptable.

SUMMARY OF THE INVENTION

With the foregoing background in mind, it is an object of the present invention to provide an improved technique for detecting the presence of received electrical signals.

It is a further object to provide such a technique having a reduced incidence of false signal indications.

Another object is to provide such reduced incidence of false signal indications while providing increased signal detection sensitivity.

A still further object is to provide such an improved signal presence detection technique with a minimum number of required computations.

Another object is to provide apparatus for performing such an improved signal presence detection technique.

These and other objects are attained generally by providing apparatus for detecting the presence of a received signal comprising a filter, fed by the received signal and having a predetermined frequency bandwidth, for producing a frequency bandwidth limited output signal and means for sampling the output signal at a predetermined sampling rate to provide a pulse train comprising samples of the output signal. Also provided is means for producing a time delayed replica of the pulse train, with the time delay between the pulse train and the replica being selected in accordance with the predetermined frequency bandwidth and the sampling rate. The pulse train is correlated with the time delayed replica to provide a correlation signal. Also provided is means for comparing the correlation signal to a threshold level to provide a signal indicating the presence of the received signal.

With this arrangement, signal detection apparatus is provided with increased noise immunity, or in other words a reduced occurrence of false signal presence indications. More particularly, the correlation signal is computed such that the noise components of the correlated signals (i.e. the pulse train and the time delayed replica thereof) are uncorrelated or statistically independent, thereby reducing the effect of noise on the signal detection. This is achieved by selecting the time delay between the correlated signals (i.e. between the pulse train and the time delayed replica) in accordance with the predetermined frequency bandwidth and the sampling rate. In the preferred apparatus, the delay is greater than the ratio of the sampling rate to the predetermined frequency bandwidth. Additionally, the correlation signal is computed in a manner requiring fewer computations than heretofore required in the use of a correlation technique. More specifically, the correlation signal is computed with a fixed delay which, as mentioned, is selected in accordance with the predetermined frequency bandwidth and the sampling rate. This arrangement provides the correlation benefit of increased noise immunity with the additional benefit of a manageable computational requirement.

In accordance with a further aspect of the present invention, a method of detecting the presence of a received signal is provided comprising the steps of filtering the received signal to provide an output signal having a predetermined frequency bandwidth, sampling the output signal at a sampling rate to provide a pulse train comprising samples of the output signal, delaying the pulse train by a time delay selected in accordance with the predetermined frequency bandwidth and the sampling rate to provide a time delayed replica of the pulse train, and correlating the pulse train and the time delayed replica to provide a correlation signal. The preferred method further includes the step of comparing the correlation signal to a threshold level to provide a signal indicating the presence of the received signal.

With this arrangement, a technique for detecting the presence of a received signal is provided with improved noise immunity. More particularly, the time delay between the pulse train and the time delayed replica thereof is selected to ensure that the noise content of the pulse train is uncorrelated with or statistically independent of the noise content of the replica so that the effect of noise on the signal detection is reduced. In a preferred embodiment, the fixed delay is greater than the ratio of the sampling rate to the predetermined frequency bandwidth. Moreover, the technique of correlation is applied in a manner requiring reduced computations than heretofore required in correlation operations since a fixed time delay is used to provide the correlation signal.

BRIEF DESCRIPTION OF THE DRAWINGS

The invention may be better understood by reference to the following more detailed description and accompanying drawings in which.

DESCRIPTION OF THE PREFERRED EMBODIMENTS

Figure 1:
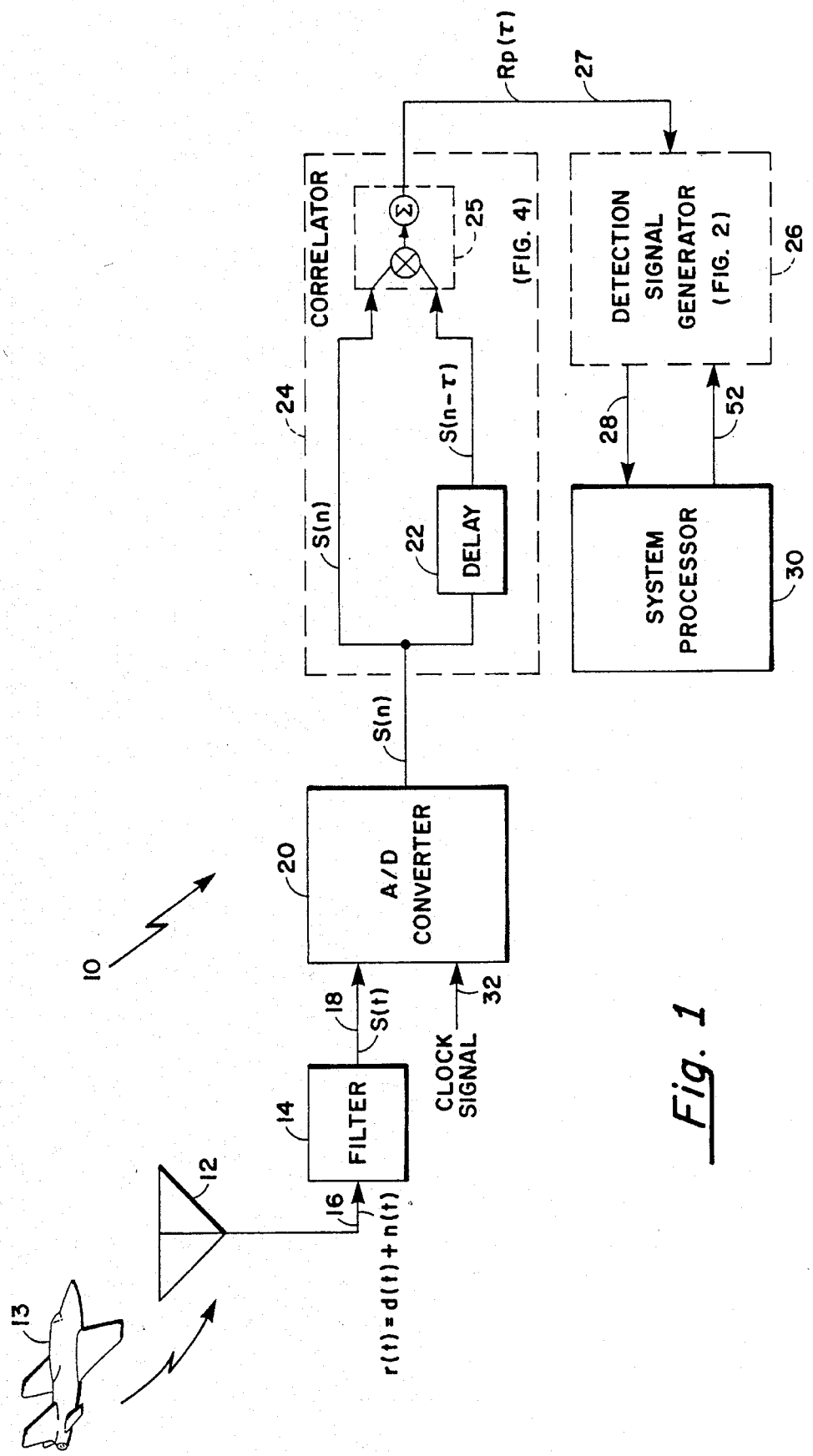
FIG. 1 is a block diagram of apparatus for detecting the presence of received electrical signals in accordance with the invention.

Referring now to FIG. 1, apparatus 10 for detecting the presence of a received signal r(t) is shown to include a receiver 12 comprising a conventional antenna and signal amplifier (not shown). The received signal r(t) includes a component d(t) associated with a target 13, such as an airplane, of which detection is desired and may also include a superimposed noise component n(t). The received signal r(t) is fed to a filter 14 via signal line 16. Filter 14 has a predetermined frequency bandwidth, here, approximately equal to 500 KHz, for producing a frequency bandwidth limited output signal s(t) on signal line 18 (note that s(t) too has a component associated with the target 13 and may also have a superimposed noise component, albeit such components having frequencies of less than approximately 500 KHz). The frequency bandlimited signal s(t) is fed to sampling means 20 which samples signal s(t) at a sampling rate to provide a pulse train s(n). More particularly, here the sampling means 20 comprises an analog to digital converter, the output of which is a pulse train s(n). Pulse train s(n) is fed to a correlator 24 and more particularly, to delay means 22 and a multiplying and summing circuit 25. The delay means 22 generates a time delayed replica s(n-τ) of the pulse train s(n). Here, the value of the time delay τ is selected in accordance with the predetermined frequency bandwidth of filter 14 and the sampling rate of analog to digital converter 20, as will be described. Both the pulse train s(n) and the time delayed replica s(n-τ) are fed to the multiplying and summing circuit 25, the output of which is a correlation signal $R_p(\tau)$ (such signal $R_p(\tau)$ alternatively being referred to as autocorrelation signal $R_p(\tau)$), as will be described in greater detail in conjunction with FIG. 3. Also provided is a detection signal generator 26 including means for comparing the correlation signal $R_p(\tau)$ to a threshold level to provide a signal, via signal line 28, indicating the presence of the component d(t) of the received signal r(t) associated with target 13 when the correlation signal $R_p(\tau)$ exceeds a predetermined threshold level, as will be described in greater detail in conjunction with FIG. 2. Signal line 28 is fed to a system processor 30, as shown, for further processing, as is conventional in electronic warfare systems. The system processor 30 provides a control signal, via signal line 52, to the detection signal generator 26, here, such signal representing the threshold level.

Here, filter 14 is a low pass filter having a cutoff frequency of approximately 500 KHz. Thus, the output signal s(t) of filter 14 is frequency bandlimited to approximately 500 KHz. Analog to digital converter 20 is fed by the filter 14 output signal s(t) via signal line 18 and a clock signal via signal line 32. Here, such clock signal has a frequency of approximately 2.0 MHz (i.e. corresponding to the sampling rate). The output signal of the analog to digital converter 20 is a pulse train s(n) comprising samples of the frequency bandlimited signal s(t). As mentioned, the pulse train s(n) is fed to multiplying and summing circuit 25 and to delay 22. The output signal of delay 22 is a time delayed replica s(n-τ) of the pulse train s(n).

The delay τ is selected so that the noise content of signals s(n) and s(n-τ) is uncorrelated or statistically independent.

More particularly, the noise content of the pulse train s(n) tends to be random (i.e. as in the case of white noise) and the autocorrelation function of a random signal approaches zero for non-zero values of delay τ. It is desirable to compute correlation signal $R_p(\tau)$ for a large value of delay τ. However, the delay τ is limited by the practical considerations of signal duration.

As mentioned, the fixed time delay τ is selected in accordance with the predetermined frequency bandwidth of filter 14, here 500 KHz, and the sampling rate of the analog to digital converter 20, here 2.0 MHz. The preferred delay τ has a value greater than the ratio of the sampling rate to the predetermined frequency bandwidth. Here, the ratio of the sampling rate to the predetermined frequency bandwidth is 2.0 MHz/500 KHz or four. However, there is a tolerance associated with the low pass filter 14 due to the time constant associated with the pass band to stop band transition. That is, the frequency bandlimited signal s(t) actually may be bandlimited to a somewhat higher or lower frequency than 500 KHz. Thus, to provide a margin for such time constant, in apparatus 10 having the above mentioned sampling rate and predetermined frequency bandwidth, the preferred fixed delay τ is eight.

Correlator 24 will be described in greater detail in conjunction with FIG. 4. Suffice it here to say however, that correlator 24 (alternatively referred to as autocorrelator 24) and more specifically multiplying and summing circuit 25 multiplies samples of the pulse train s(n) by samples of the time delayed replica s(n-τ) and sums such products to provide correlation or autocorrelation signal $R_p(\tau)$ on signal line 27, as shown. As mentioned above, autocorrelation signal at $R_p(\tau)$ is fed to detection signal generator 26, the output of which is a signal carried by signal line 28 indicating the presence of the component d(t) of the received signal r(t) when the correlation signal $R_p(\tau)$ has a level greater than the predetermined threshold level, as will now be described.

Figure 2:
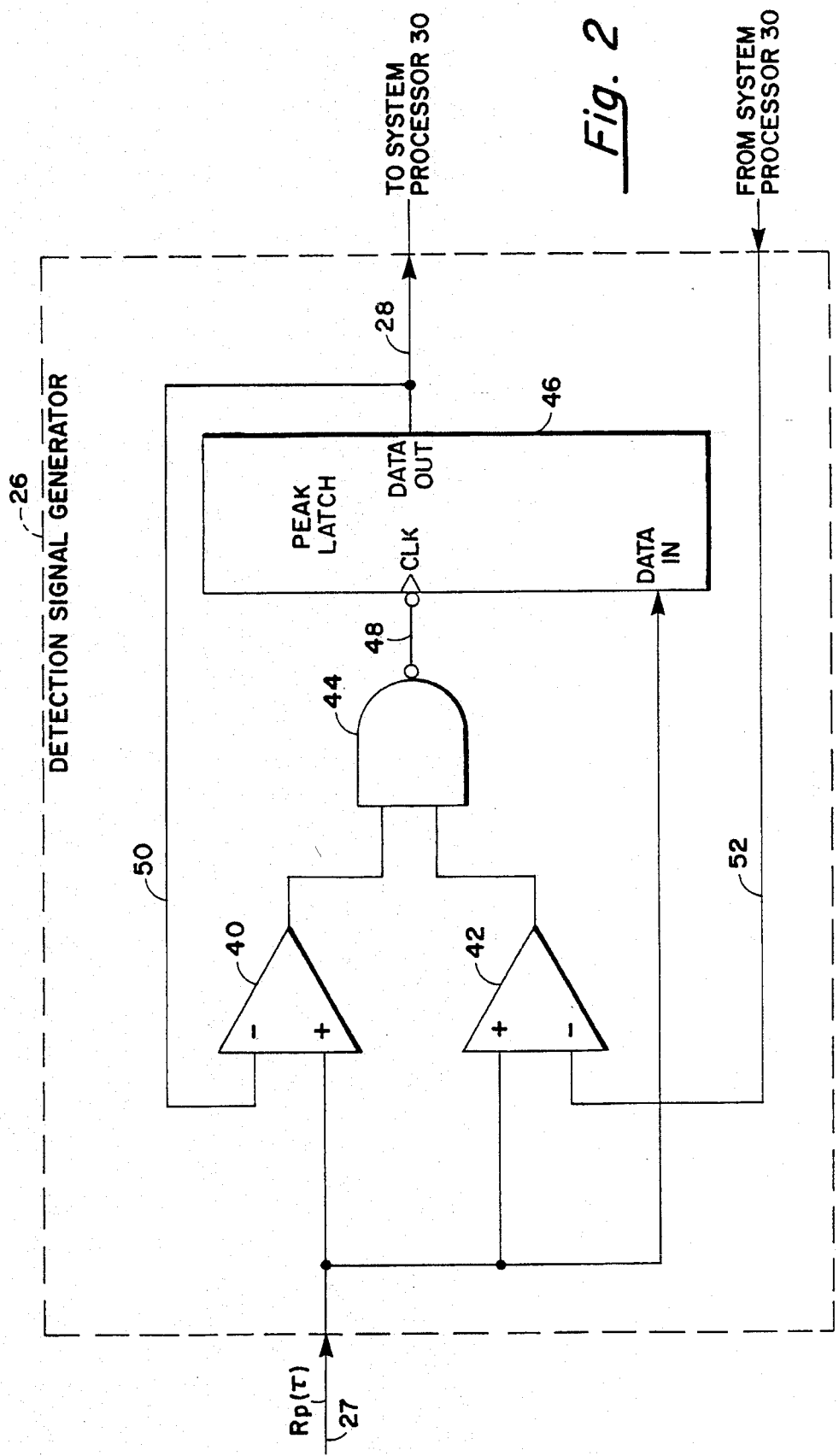
FIG. 2 is a block diagram of the detection signal generator of the apparatus of FIG. 1.

Referring now to FIG. 2, consider the detection signal generator 26 in greater detail. The correlation signal $R_p(\tau)$ is fed to the detection signal generator 26 via signal line 27, as shown. More particularly, the correlation signal $R_p(\tau)$ is fed to first, and here non-inverting, inputs of a pair of comparators 40, 42 and a first input of a peak latch 46. A logic output of each of the comparators 40, 42 is coupled to inputs of a NAND gate 44, the output of which is coupled to a second input of peak latch 46 via signal line 48. Second, and here inverting, inputs of comparators 40, 42 are fed by signal lines 50, 52, respectively. More particularly, the signal carried by signal line 50 is provided by peak latch 46 and represents the last stored, or latched, peak value. The signal carried by line 52 represents the threshold level from system processor 30, referred to above. As mentioned, the signal carried by line 28 indicates the presence of the component d(t) of received signal r(t) when the correlation signal $R_p(\tau)$ has a level different from the predetermined threshold level. More particularly, signal lines 28 carries a signal indicating the peak value of the detected signal.

In operation, the peak latch 46 is initially cleared to a zero state. Correlation signal $R_p(\tau)$ is here, simultaneously, compared to the prior stored peak value by comparator 40 and to the threshold level by comparator 42. Consider first the case where the value of correlation signal $R_p(\tau)$ carried by signal line 27 is less than the threshold level and less than the peak value. With this condition, the inputs to the NAND gate 44 (i.e. the outputs of comparators 40 and 42) are in their logic low states. The output of NAND gate 44 is thus in its logic high state. With the signal carried by signal line 48 in its logic high state, latch 46 is not enabled and therefore, the output signal thereof carried by signal line 28 is not updated. In other words, since the correlation signal $R_p(\tau)$ is not greater than the threshold level or the peak value, no new peak value is latched. Stated differently, the signal carried by line 28 is maintained constant.

Consider next the case where the correlation signal $R_p(\tau)$ is greater than the threshold level but less than the latched peak value carried by signal line 50. For example, this may occur when a signal r(t) is received from target 13, but the peak of the energy received from such target 13 has previously been received and latched. With this arrangement, the output of comparator 42 is in its logic high state and the output of comparator 40 is in its logic low state. Thus, the output of the NAND gate 44 is in its logic high state. As above, when the input to the latch 46 carried by signal line 48 is in its logic high state, the latch 46 is not enabled and the output signal thereof carried by signal line 28 is equal to the stored peak value.

Consider finally, the case where the correlation signal $R_p(\tau)$ is greater than the threshold level and greater than the latched peak value. In this case, the outputs of each of comparators 40 and 42 are in their logic high states and thus, the output of the NAND gate 44, or the signal carried by signal line 48, is in its logic low state. With this arrangement, the latch 46 is enabled and the output signal thereof is set equal to the correlation signal $R_p(\tau)$. In other words, latch 46 updates the output signal of signal line 28 by setting it equal to this new correlation signal $R_p(\tau)$. Additionally, the enabled latch 46 stores the value of the correlation signal $R_p(\tau)$ to provide a new latched peak value on signal line 50. Such new peak value is fed to the input of comparator 40 via signal line 50 for comparison with the next value of the correlation signal $R_p(\tau)$.

From the above discussion of the operation of detection signal generator 26, it should be apparent that various modifications can be practiced without departing from the general idea of the detection operation. For example, it may be desirable to provide the output of comparator 42 to the system processor 30 (FIG. 1) to provide a logic signal indicating simply whether or not the correlation signal $R_p(\tau)$ is above the threshold level. That is, it may be desirable to indicate the presence of the component d(t) of the received signal r(t) when the correlation signal $R_p(\tau)$ has a level different from the predetermined threshold level.

Before considering the preferred implementation of correlator 24 (FIG. 1), note that the estimated autocorrelation function is given generally by the following equation:

$$R_p(\tau) = \frac{1}{L} \sum_{n=0}^{L-1} s(n)s(n-\tau) \qquad (1)$$

where L is the length of the time series $\{s(n)\}$.

Given practical computation limitations, the number of samples (L) of the product of the time series $\{s(n)\}$ and the time delayed replica $\{s(n-\tau)\}$ that are summed and the delay $\tau$ are set to finite numbers. For example, the fixed delay $\tau$ may be set equal to eight. Also, the signal $R_p(\tau)$ may be processed with circuitry, such as a threshold detector, which provides a multiplication factor of L, thereby canceling the $1/L$ term in equation (1). Thus, the equation becomes:

$$R_p(8) = \sum_{n=0}^{L-1} s(n)s(n-8) \qquad (2)$$

where L may be referred to as the length of the correlation window. Here, the preferred correlation window length L is equal to 400. The index "p" may be referred to as the index of correlation and represents samples of the correlation signal $R_p(\tau)$, as will become apparent from the description of FIGS. 3 and 4 below. Suffice it here to say that for p<L, the autocorrelation signal $R_p(\tau)$ is given by equation (2) above. Once p≥L, during the generation of subsequent samples of the autocorrelation signal $R_p(\tau)$, the correlation window (i.e. the L samples summed to provide $R_p(\tau)$), in effect, moves along the "n" axis (i.e. the discrete time axis). More specifically, for values of p≥L, the correlation signal $R_p(\tau)$ is given by the following equation:

$$R_p(\tau) = R_{p-1}(8) - s(i)s(i-8) + s(L+i)(L+i-8) \qquad (3)$$

where the index "i" is equal to p−L.

Figure 3:
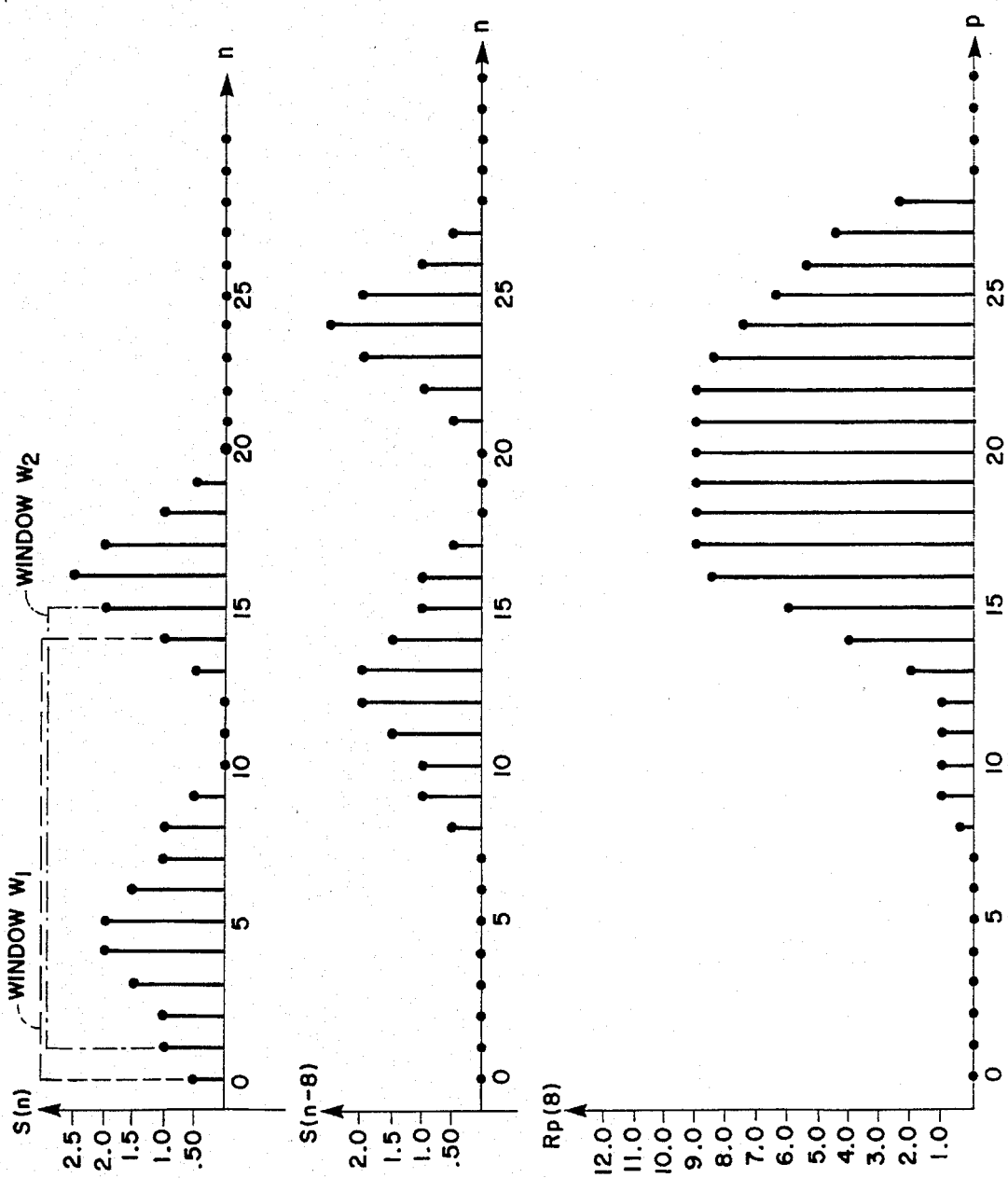
FIG. 3 is a plot showing an exemplary pulse train s(n) processed by the apparatus of FIG. 1, a time delayed replica s(n-8) of the pulse train s(n), and the resulting correlation signal $R_p(8)$.

The above equations and their implementation in generating $R_p(\tau)$ will be better understood with reference to FIG. 3 which shows an exemplary time series or pulse train $\{s(n)\}$, time delayed replica $\{s(n-\tau)\}$ thereof, and correlation signal $R_p(\tau)$. In the example of FIG. 3, the window length L is equal to fifteen for simplicity (i.e. as the preferred window length of L=400 is too cumbersome to show) and $\tau$=8. Thus, in this case, $R_p(\tau)$ samples $R_0(8)$ to $R_{14}(8)$ are given by equation (2) above since p<L for such samples. Note that for the samples of $R_p(\tau)$ where p<$\tau$, the autocorrelation signal $R_p(\tau)$ is equal to zero. In other words, here $R_0(8)$ to $R_7(8)$ are equal to zero, as shown. Samples $R_8(8)$ to $R_{14}(8)$ of the correlation signal $R_p(8)$ correspond to the correlation window being in its initial location (as shown by window $W_1$). For correlation signal samples where p≥L, equation (3) is used to compute the signal $R_p(\tau)$, as mentioned. During this interval, the correlation window comprising L samples "moves" and, as it does so, a sample "leaves" the window and a sample "enters" the window. More particularly, when computing autocorrelation signal sample $R_{15}(8)$, the window is moved to the position shown by window $W_2$. Thus, signal sample $R_0(8)$ has "left" the window and sample $R_{15}(8)$ has "entered" the window. In other words, as the window moves, the autocorrelation signal $R_p(\tau)$ is updated by subtracting the sample no longer within the window, such sample being given by s(i)s(i−8) and adding a new sample now within the window, such new sample being given by s(L+i)s(L+i−8).

Referring still to FIG. 3, and particularly to correlation signal $R_p(\tau)$, it is notable that such signal level decreases, here at signal sample $R_{23}(8)$. More particularly, in prior art detection techniques such as filtering, the value of the averaged signal increases monotonically. Thus, manual or electronically time controlled resetting of such prior art detection apparatus is required in order to detect subsequent targets. For example, an operator of a system employing such detection apparatus may reset the circuitry manually to bring the averaged value below the threshold once the presence of a target or other desired signal is detected. In the subject apparatus, however, the correlation signal $R_p(\tau)$ (unlike an average value of samples of a received signal) is automatically reset. More specifically, the correlation signal $R_p(\tau)$ does not increase monotonically, but rather increases and decreases in accordance with the autocorrelation function given by the above equations. Thus, while manual, time controlled, or other techniques heretofore used for resetting the apparatus may be used, alternatively an automatic resetting scheme may be implemented. More specifically, an automatic resetting scheme may be achieved by detecting the point at which samples of $R_p(\tau)$ decrease in value (i.e. an indication that the peak of the received signal has been processed and latched) and resetting the latch in response to such detection.

Figure 4:
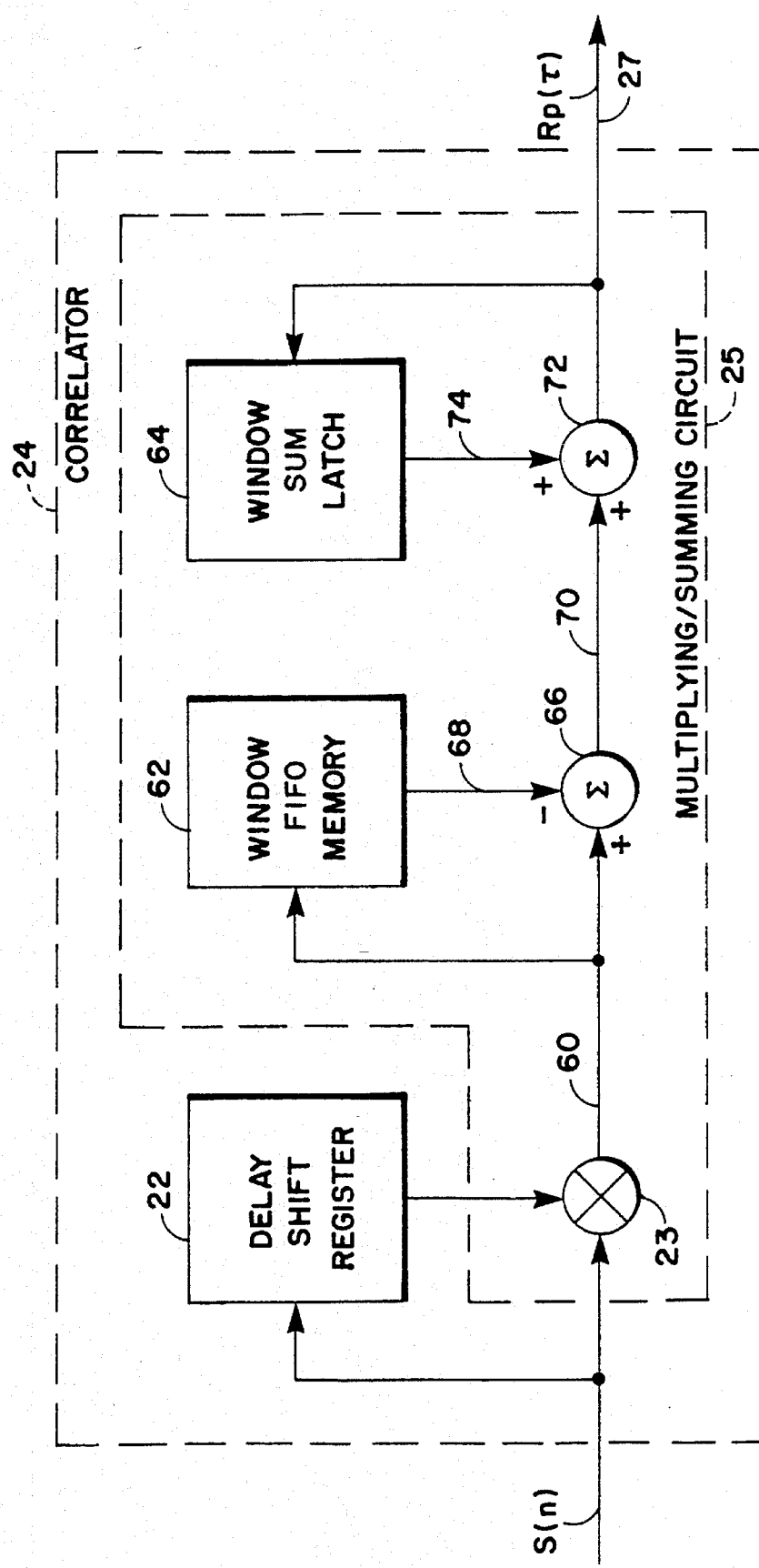
FIG. 4 is a block diagram of the correlator of the apparatus of FIG. 1.

Referring now to FIG. 4, the implementation of the correlator 24 (FIG. 1) will now be described. As mentioned above in conjunction with FIG. 1, pulse train or time series {s(n)} is fed to a delay 22, here a shift register 22, and to multiplying and summing circuit 25. Shift register 22 delays time series {s(n)} by fixed delay τ, here equal to eight. Note also that here, the index n is equal to L+i. Thus, multiplying and summing circuit 25, and more particularly, multiplier 23 thereof, is fed by time series {s(L+i)} and time delayed replica {s(L+i−8)} and provides the product s(L+i)s(L+i−8) on signal line 60. Thus, the output of multiplier 23 represents the sample that "enters" the window once it moves. For example, when the window moves to position $W_2$ (FIG. 3), the sample entering such window is $R_{15}(8)$. Here, time series {s(L+i)} and time delayed replica {s(L+i−8)} are eleven bit digital words and the output of multiplier 23 is a sixteen bit digital word.

Signal line 60 is fed to a memory 62 and a summing circuit 66. More particularly, here memory 62 is a First In First Out Memory (FIFO) 62. FIFO 62 is here a 400×16 FIFO, where 400 represents the window length L. Thus, FIFO 62 may be referred to as window FIFO memory 62. More particularly the output signal of FIFO 62 carried by signal line 68 represents the sample "leaving" the correlation window once it moves. That is, when the window of FIG. 3 moves from position $W_1$ to position $W_2$, the sample "leaving" the window is $R_0(8)$. Note that for p<L, the output of FIFO 62 is zero since during this interval, the index "i" is negative and such samples of s(n) are initialized to zero. Once p≧L however, the output of FIFO 62 is given by s(i)s(i−8).

The output of FIFO 62 is fed to summing circuit 66 via signal line 68, as shown. Circuit 66 subtracts the output signal of line 68 from the signal of line 60 to provide an output signal on line 70, here such output signal being a seventeen bit digital word (i.e. sixteen bits of data and one sign bit). In view of the above, it should be apparent that the signal carried by line 70 is given by:

$$s(L+i)s(L+i-8) - s(i)s(i-8) \quad (4)$$

Signal line 70 is fed to a second summing circuit 72 which adds the signal of line 70 (given by equation (4)) with an output signal of a window sum latch 64 carried by signal line 74 and given by $R_{p-1}(8)$. That is, latch 64 stores $R_p(8)$ to provide $R_{p-1}(8)$ for processing the subsequent signal sample of $R_p(8)$. Thus, it is apparent that for p<L, latch 64 sums the product s(n)s(n−8) for n=8 to p in an accumulation manner, in accordance with equation (2), whereas for p≧L, the latched value of $R_p(\tau)$ is provided as $R_{p-1}(8)$. The output signal of adder 72 is thus, the correlation signal $R_p(\tau)$ provided on signal line 27 and further processed by detection signal generator 26 as described above. As mentioned, output signal $R_p(\tau)$ is given by equation (3) above. Here, such autocorrelation signal $R_p(\tau)$ represents a twenty-six bit digital word.

Having described the preferred embodiment of the invention, it is now evident that other embodiments incorporating these concepts may be used. For example, it should be apparent that alternative implementations of correlator 24 may be utilized to provide the correlation signal $R_p(\tau)$ as given by equation (3). Also, if detecting the presence of certain types of received signals such as complex periodic waveforms (i.e. having "I" and "Q" components) is desired, conjugation of the signal may be required. It is felt therefore, that the invention should not be restricted to the disclosed embodiment but rather should be limited only by the spirit and scope of the appended claims.

What is claimed is:

1. Apparatus for detecting the presence of a received signal comprising:
    (a) filter means, fed by said received signal, such filter having a predetermined frequency bandwidth for producing a frequency bandwidth limited output signal;
    (b) means for sampling said output signal at a sampling rate to provide a pulse train comprising samples of the output signal;
    (c) means for producing a time delayed replica of said pulse train, said time delay between said pulse train and said replica being selected in accordance with said predetermined frequency bandwidth and said sampling rate;
    (d) means for correlating said pulse train with said time delayed replica of said pulse train to provide a correlation signal; and
    (e) means for comparing said correlation signal to a predetermined threshold level to provide a signal indicating the presence of said received signal, said comparing means comprising:
    a first comparator for comparing said correlation signal to said threshold level;
    memory means for storing said signal indicating the presence of said received signal;
    a second comparator for comparing said correlation signal to said signal indicating the presence of said receiver signal from said storing means; and
    means responsive to outputs of said first and second comparators for updating said memory means with a new signal indicating the presence of said received signal when said correlation signal is greater than said threshold level and said stored signal indicating the presence of said received signal, said new signal being equal to said correlation signal.

2. The apparatus recited in claim 1 wherein said delay is greater than the ratio of the sampling rate to said predetermined bandwidth.

3. The apparatus recited in claim 1 wherein said correlating means comprises means for multiplying said pulse train and said time delayed replica of said pulse train to provide said correlation signal.

4. The apparatus recited in claim 1 wherein said sampling means comprises an analog to digital converter.

* * * * *